United States Patent [19]

McComas

[11] Patent Number: 6,066,406
[45] Date of Patent: May 23, 2000

[54] COATING COMPOSITIONS CONTAINING NICKEL AND BORON

[75] Inventor: Charles Edward McComas, Palm City, Fla.

[73] Assignee: Biocontrol Technology, Inc., Pittsburgh, Pa.

[21] Appl. No.: 09/074,703

[22] Filed: May 8, 1998

[51] Int. Cl.[7] .......................... B32B 15/00; C23C 18/34; C23C 18/50
[52] U.S. Cl. .................. 428/680; 428/936; 427/383.7; 427/438; 148/537
[58] Field of Search ....................... 428/680, 679, 428/652, 675, 678, 457, 936; 427/438, 383.7; 148/537; 106/1.22, 1.27

[56] References Cited

U.S. PATENT DOCUMENTS

| 3,674,447 | 7/1972 | Bellis | 29/96.6 |
|---|---|---|---|
| 4,113,248 | 9/1978 | Yanagioka | 273/72 A |
| 4,338,131 | 7/1982 | Briggs, Jr. et al. | 148/403 |
| 4,833,041 | 5/1989 | McComas | 428/610 |
| 4,983,428 | 1/1991 | Hodgens, II | 427/443.1 |
| 5,062,797 | 11/1991 | Gonser | 433/118 |
| 5,213,907 | 5/1993 | Caballero | 428/678 |
| 5,786,976 | 7/1998 | Field | 361/215 |

FOREIGN PATENT DOCUMENTS

WO 88/08887  11/1988  WIPO .

Primary Examiner—John J. Zimmerman
Attorney, Agent, or Firm—William L. Krayer

[57] ABSTRACT

The invention is directed to corrosion and wear resistant metallic coatings containing nickel and boron. The coatings are preferably deposited on catalytically active substrates from an electroless coating bath containing nickel ions, lead tungstate as a stabilizer, a metal ion complexing agent, and a borohydride reducing agent, at a pH of about 10 to about 14. With post-coating heat treatment the coated surfaces exhibit hardness levels as high as about 2200 Knoop.

12 Claims, No Drawings

COATING COMPOSITIONS CONTAINING NICKEL AND BORON

BACKGROUND OF THE INVENTION

This invention relates to novel metal coating which exhibit exceptional hardness. More particularly this invention relates to metal coatings containing nickel and boron and to the reductive deposition of said coatings on the surfaces of substrate articles from aqueous solutions at an alkaline pH.

The plating or deposition of metal alloys by chemical or electrochemical reduction of metal ions on the surface of an article to modify its surface characteristics for both decorative and functional purposes is well known in the art. Of particular commercial significance is the deposition of metal/metal alloy coatings on both metal and activated non-metal substrates to enhance surface hardness and resistance to corrosion and wear. Nickel-boron and cobalt-boron alloy coatings are recognized in the art for their hardness and associated wear-resistance. The patent literature reflects an ongoing research and development effort in the area of nickel-boron coatings with the goal of producing still harder, more corrosion resistance coatings. For example, see, U.S. Pat. Nos. 5,019,163; 3,738,849; 3,674,447; 3,378,400; 3,045,334. The art has recognized that when borohydride is used in a nickel/boron-plating bath a harder coating is achieved. However, borohydride, is very unstable in the bath. The solution to the stability problem has been to add stabilizers such as thallium sulfate or lead chloride. The addition of the stabilizers had the effect of interfering with the formation of the nickel coating thereby negatively impacting the hardness of the coating. Because the stabilizer is not co-deposited in the coating in accordance with the present invention the nickel coating is remarkably more hard than those described in the prior art.

To-date nickel/boron coatings have always included a stabilizer as a third element. The only exception is a dimethyl borane coating. This type of coating does not have the stabilizer present in the coating. This process has very limited application because the bath has a very slow deposit rate and the coating is very thin. The deposit rates are in the order of 0.00015 inches per hour. The thickness of the deposit is limited to about 0.0001–0.0002 inch. These deposits are too thin to be used for wear surfaces.

It is therefore a general object of this invention is to provide an article of manufacture coated on at least a portion of its surface with a hard, ductile, wear and corrosion resistant metal coating comprising both nickel and boron, without the co-deposition of a stabilizer.

Yet another object of this invention is to provide coating baths from which a hard, ductile, wear and corrosion resistant coating can be deposited on at least a portion of the surface of a metal or activated non-metal substrate.

SUMMARY OF THE INVENTION

According to the present invention there is provided a novel metal coating composition containing both nickel and boron and lead tungstate. The coating composition can contain other metal ions such as cobalt. The coating composition is particularly useful for deposition on a surface of an article of manufacture, which is subject to exposure to corrosive conditions or one subject to sliding or rubbing contact with another surface under unusual wearing and bearing pressures. The metal coating composition of the present invention comprises out 67.5 to about 97.0 weight percent nickel, about 0 to about 48.5 weight percent cobalt, about 0.5 to about 10 weight percent boron. Cobalt can be substituted for nickel up to about 50% of the nickel. Preferably the substitution of cobalt for nickel is less than 25% of the nickel. A preferred range for the nickel coating is 94–97 weight percent nickel and 3–6 weight percent boron. The coating is remarkably hard, yet ductile, and is highly corrosion and wear resistant.

It has now been surprisingly discovered that by using lead tungstate to stabilize a nickel-boron plating bath it becomes possible to form a nickel/boron coating with even higher hardness that had previously been achieved. Stabilizers have been conventionally added to these plating baths to retard the precipitation of the reducing agent in the coating bath itself. These stabilizers are co-deposited with the nickel coating. This co-deposition prevented full formation of the nickel coating thereby limiting the hardness and wear resistance of the nickel boron coating. The discovery was that by substantially preventing co-deposition of the stabilizer the hardness of nickel/boron coating is increased.

In accordance with the present invention, lead tungstate precipitates out as a particle in the plating bath rather than co-deposit in the coating. These particles can be removed by trapping the particles in a filtration system.

The present coating is preferably applied to a substrate electrolessly by contacting the substrate with a coating bath containing nickel ions, lead tungstate ions, a metal ion complexing agent, and a borohydride reducing agent at pH about 10 to about 14 and at an elevated temperature of about 180 to about 210° F. The coating can be plated at lower temperatures after the plating has been initiated within a temperature range of about 180 to about 210° F.

DETAILED DESCRIPTION OF THE INVENTION

Suitable substrates for electroless deposition of those with so-called catalytically active surfaces including those composed of nickel, cobalt, iron, steel, aluminum, zinc, palladium, platinum, copper, brass, chromium, tungsten, titanium, tin, silver carbon, graphite and alloys thereof. Those materials function catalytically to cause a reduction of the metal ions in the plating bath by the borohydride and thereby result in deposition of the metal alloy on the surface of the substrate in contact with the plating bath. Aluminum usually requires a protective strike coat to prevent dissolution before plating. Non-metallic substrates such as glass, ceramics and plastics are in general, non-catalytic materials; however, such substances can be sensitized to be catalytically active by producing a film of one of the catalytic materials on its surface. This can be accomplished by a variety of techniques known to those skilled in the art. One preferred procedure involves dipping articles of glass, ceramic, or plastic in a solution of stannous chloride and then contacting the treated surface with a solution of palladium chloride. A thin layer of palladium is thereby reduced on the treated surface. The article can then be plated or coated with the metallic composition in accordance with this invention by contact with a coating bath as detailed below. It is to be noted that magnesium, tungsten carbide and some plastics have exhibited some resistance to deposition of the present coatings.

A coating bath for deposition of the present coatings comprises (1) Nickel ions, about 0.175 to about 2.10 moles per gallon. Calculations were based on a nickel chloride range of 0.05 to 0.6 pounds per gallon. A preferred range of nickel ions is about 0.35 to about 1.57 moles per gallon based on 0.1 to about 0.45 pound per gallon of nickel chloride.

(2) Cobalt ions, up to 1.05 moles per gallon but no greater than 50% of the nickel present in the bath;
(3) An effective amount of a chemical agent for adjusting the pH of the bath to between about 10 and about 14;
(4) about 2.26 to about 6.795 moles per gallon of metal ion complexing agent, preferably 3.3 to 3.8 moles per gallon
(5) about 0.01 to about 0.8 moles per gallon of coating bath of a borohydride reducing agent based on sodium borohydride preferably 0.020 to 0.033 moles per gallon of bath;
(6) about 0.003 per grams per gallon to about 0.30 grams per gallon, lead tungstate as a stabilizer, preferably about 0.008 to about 0.08 grams per gallon.

The borohydride reducing agent can be selected from among the known borohydrides having a good degree of water solubility and stability in aqueous solutions. Sodium borohydride is preferred. In addition, substituted borohydrides in which not more than three of the hydrogen atoms of the borohydride ion have been replaced can be utilized. Sodium trimethoxyborohydride [$NaB(OCH_3)_3H$] is illustrative of that type of compound.

The coating bath is prepared to have a pH of about 12 to about 14. Best results have been observed when the pH of the bath is maintained during the coating process within that range and more preferably at about pH 13.5. Adjustment of bath pH can be accomplished by addition of any of a wide variety of alkaline salts or solutions thereof. Preferred chemical agents for establishing and maintaining bath pH are the alkali metal hydroxides, particularly sodium and potassium hydroxide, and ammonium hydroxide. Ammonium hydroxide offers an additional advantage in that the ammonium ion can function to assist metal ion complexing in the coating bath.

Due to the high alkalinity of the coating bath, a metal ion complexing or sequestering agent is required in the bath to prevent precipitation of the metal ions such as nickel and other metal hydroxides or other basic salts. Importantly, too, the metal ion complexing agent functions to lower metal ion reactivity; the complexed or sequestered metal ions have minimal reactivity with the borohydride ions in the bulk solution but do react at the catalytic surfaces of substrates in contact with the solution. The term catalytic surface refers to the surface any article composed of the aforementioned catalytic materials or to the surface of a non-catalytic material which has been sensitized by application of a film of said catalytic materials on its surface.

The complexing or sequestering agents suitable for use in this invention include ammonia and organic complex-forming agents containing one or more of the following functional groups: primary amino, secondary amino, tertiary amino, imino, carboxy and hydroxy. Many metal ion complexing agents are known in the art. Preferred complexing agents are ethylenediamine, diethylene triamine, triethylene tetramine, the organic acids, oxalic acid, citric acid, tartaric acid and ethylene diamine tetraacetic acid, and the water soluble salts thereof. The most preferred is ethylene diamine.

About 2.26 to about 6.795 moles per gallon of complexing agent are used per gallon of coating bath. This calculation was based on 0.3 to about 0.9 pound per gallon of ethylenediamine. Best results have been obtained when about 3.39 to about 3.77 moles per gallon of coating bath. This calculation was based on about 0.45 to about 0.5 pound per gallon of ethylenediamine for each gallon of coating bath.

The metal ions like nickel ions in the coating bath are provided by the addition to the bath of the respective water soluble salts. Any salts of those metals having an anion component which is not antagonistic to the subject coating process is suitable. For example salts of oxidizing acid such as chlorate salts are not desirable since they will react with the borohydride reducing agent in the bath. Cobalt and nickel, chlorides, sulfates, formates, acetates, and other salts whose anions are substantially inert with respect to the other ingredients in the alkaline coating bath are satisfactory.

Lead tungstate can be added to the plating bath from a concentrate containing a pH modifier and a complexing agent. The complexing agent can be selected from those mentioned above. The preferred complexing agent is ethylenediamine. The concentrate contains about 2 to about 31 grams per gallon of lead tungstate. The preferred range of lead tungstate is about 7 to about 12 grams per gallon. The concentration range of the complexing agent is 100 to 700 milliliters. The preferred range of complexing agent is about 300 to about 400 milliliters. The pH of the mixture is above 8, preferably at 10.5. The pH modifier is selected from those bases such as sodium hydroxide, that are not harmful to the plating bath.

The concentrate is added to the bath so that upon dilution the concentration of lead tungstate in the bath can range between 0.003 to 0.30 grams per gallon of plating bath. The preferred concentration range is greater than 0.008 to about 0.2 grams per gallon of plating bath.

The coating bath is typically prepared by forming an aqueous solution of the appropriate amounts of nickel and cobalt salts, adding the complexing agent(s) and stabilizer, adjusting the pH to about 12 to about 14, heating to about 195° F., filtering and finally, immediately before introducing the substrate into the bath, adding the required amounts of sodium borohydride (typically in aqueous alkaline solution).

The article to be coated or plated using a bath in accordance with this invention is prepared by mechanical cleaning, degreasing, anode-alkaline cleaning, and finally pickling in an acid bath in accordance with the standard practice in the metal-plating art. The substrate can be masked if necessary to allow deposition of the metal alloy coating only on selected surfaces. Although the present coatings in general exhibit excellent adhesion to properly prepared substrate surfaces, in instances where coating adhesion is critical or where some adhesion problems are experienced, coating-adhesion can often be enhanced by depositing a nickel strike electrochemically on the substrate surface prior to applying the present coating.

The cleaned or otherwise surface-prepared article is immersed in the hot (about 180 to about 210° F.) coating bath to initiate the coating process. The process is continued until deposition of the coating has progressed to the desired thickness or until the metal ions are depleted from solution. Deposition rates vary under the conditions of the present process from about 0.1 mil (1 mil=one one-thousandth of an inch) to about 1.5 mil per hour.

The preferred range of the ingredients of the plating bath comprises about 0.35 to about 1.57 moles per gallon nickel, about 0.008 to about 0.08 moles per gallon lead tungstate ions, about 0.017 to about 0.035 moles per gallon of borohydride. The ratio of nickel, cobalt, boron and lead tungstate in the present coatings can be adjusted by varying the relative amounts of the metal salt components and borohydride in the coating bath.

Under normal usage conditions of the coating baths in accordance with the present invention, lead tungstate and borohydride reducing agent are added to the coating bath hourly in amount equivalent to their usage in preparation of the bath initially. The need to replenish the present coating baths with lead tungstate and borohydride depends on the ratio of coating bath volume to the surface area being coated. Thus replenishment of lead tungstate and borohydride to the present coating bath would not be required when small surface areas are being treated.

One gallon of bath prepared in accordance with the preferred embodiment of the present invention will coat approximately 144 square inches to a thickness of 1 mil. For this result to be achieved the bath is replenished with lead tungstate and borohydride in accordance with the above description as those components are depleted from solution.

The pH of the coating bath will tend to drop during the coating process and should be checked periodically to assure that it is within the preferred pH range of about 12 to about 14. It has been found that any problems with pH maintenance throughout the use of a coating bath can be minimized simply by using a highly alkaline (concentrated sodium hydroxide) solution of borohydride to replenish the borohydride content of the bath as required. The coating deposition rate from the present electrodes coating bath is about 0.1 to about 1 mil per hour and is dependent on bath temperature, pH, and metal ion concentration. The deposition rate on most metal substrates from freshly prepared coating baths at a preferred temperature of about 185 to about 195° F. is approximately 1 mil per hour.

The practical aspects carrying out electroless coating processes are well known in the art. Such processes are disclosed generally in U.S. Pat. No. 5,109,163 issued to McComas on May 28, 1991; U.S. Pat. No. 3,338,726 issued to Berzins on Aug. 19, 1967; U.S. Pat. No. 3,096,182 issued to Berzins on Jul. 2, 1963; U.S. Pat. No. 3,045,334 issued to Berzins on Oct. 1, 1958; U.S. Pat. No. 3,378,400 issued to Sickles on Apr. 16, 1968; and U.S. Pat. No. 2,658,841 issued to Gutzeit and Krieg on Nov. 10, 1953; the disclosures of which are hereby incorporated by reference.

The electroless nickel coatings of the present invention exhibit unprecedented hardness and concomitant wear resistance. They are highly ductile allowing the coating to flex with the substrate while maintaining a strong bond to the coated material. The coatings are amorphous, and nonporous.

After the nickel coating is deposited on a substrate, the conventional step in the prior art is to heat treat the coating to achieve maximum hardness. Prior to heat treatment the prior art nickel/boron coatings had a Knoop hardness of approximately 925. After heat treatment, the prior art nickel/boron coatings had Knoop hardness below 1350. In contrast by using lead tungstate as a stabilizer the Knoop hardness of the nickel/boron coating before heat treatment is about 1000. After heat treatment, the Knoop hardness of the nickel/boron coating is in excess of 1350.

The heat treatment is accomplished at a temperature of about 375 to about 750° F. for a period of about one to about 24 hours. Shorter times, about one to two hours, is preferred for the higher temperatures of between about 550–750° F. Longer heat treatment times have been shown to be advantageous at the lower temperature ranges of between about 375 to about 450° F.

The structure of the nickel/boron coating changes during heat treatment. Before heat treatment the nickel and boron appear to combine to form a alloy. After heat treatment nickel boride is formed. The coating appears to be a nickel boride dispersion within the nickel/boron alloy.

Any thickness of the coating can be achieved. Coatings thickness greater than 0.0001 inch to 0.04 inch or greater can be produced. Conventional wear coatings having a thickness range from about 0.0005 inch to about 0.004 inch can be produced.

The present coatings have a wide range of applications, which will be recognized by those skilled in the art. They have particular utility for coating surfaces of articles that under normal use are subjected to highly abrasive, rubbing, or sliding conditions under high temperatures/pressures. Such high wear conditions are found at many points in construction of tools, internal combustion engines including gas turbine engines, transmissions and in a wide variety of heavy equipment construction applications.

The following example provide details of bath compositions, process conditions, and coating compositions and properties representative of the present invention. The example is illustrative of the invention and are not in any way to be taken as limiting the scope thereof.

EXAMPLE

A one(1) gallon batch unit of coating bath was prepared as follows. For the purposes of this example, four solutions were prepared: A (the bath), B (the reducer), C (the stabilizer), and D (the bath replenisher). First, one gallon batches of each solution were prepared. Solution A (the bath) consisted of deionized water, 0.2 lb. nickel chloride, 0.5 lb. ethylenediamine, and 0.33 lb. of sodium hydroxide. Solution B (the reducer) consisted of deionized water, 2.5 lbs. of sodium hydroxide and 0.8 lbs. of sodium borohydride. Solution C (the stabilizer) consisted of deionized water, 100 grams of sodium hydroxide and 10 grams of lead tungstate and 400 ml of ethylene diamine. Solution D (the bath replenisher) consisted of deionized water, 0.6 lb. of nickel chloride, 1.5 lbs. of ethylenediamine and 1.0 lb. of sodium hydroxide (solution D was the same as solution A, but with less water).

Solution A was heated to 192° F. Two 1"×1" panels of stainless steel were cleaned with detergent, so that the panels are free of oil and soil. The panels were fixed to a steel wire and placed in a solution of 30% HCl and 20% $H_2SO_4$ for 60 seconds in order to activate the parts. Just before the panels were placed into the bath for plating, 10 mls of Solution B mixed with 10 mls of Solution C were added to the heated Solution A. For solution a 8–12 milliliters of can be used.

After 30 minutes, Solution A was titrated for the presence and amount of sodium borohydride. An additional 10 mls of Solution B and 10 mls of Solution C, mixed together, were added after every 30 minutes of plating. The plating continued for 3 hours.

After 3 hours, the panels were removed from the bath and measured for deposit thickness. The heat treatment was at 750° F. for ninety minutes. The panels measured 0.0347 inches before plating and 0.0407 inch after plating, showing a total thickness increase of 0.006 inch, or 0.003 inch per side, or a deposition rate of 0.001 inch per hour.

The panels were smooth, continuous, and free from porosity. The panels were then cut, mounted, cross-sectioned and checked for hardness in accordance to standard micro hardness test studies. The coating could then be examined in the profile showing the interface area between the coating and substrate. This area was free of voids and foreign matter.

The hardness of the coated panels was measured, using a Knoop indentor with a 100-gram load. The hardness values before heat treatment was about 950 to about 1050. The hardness values after heat treatments were as follows: 1545, 1685, 1610, 1785, 1660, 1710, 1690, 1820, 1730, and 1710. If the highest and lowest value were dismissed and the remaining values averaged to a final hardness value of 1697. This shows that the novel plating composition produces reproducible high hardness values. This is at least 25% harder than other nickel boron coatings in the prior art and, therefore, manifested as much as a 300% improvement in wear resistance.

The remaining plated samples were analyzed using ICP technology to find the quantitative composition of the coating. The ICP results (X-ray) showed a composition of 95.5% nickel and 4.5% boron and trace elements with a probable error of 0.5%. Before heat treatment the coating was a nickel/boron alloy. After heat treatment the coating had a dispersion of nickel boride in the nickel/boron alloy. Heat-treated coatings in accordance with the present invention have been found to have a Knoop hardness value of between about 1400 and to about 2200. These values are higher than the best hardness values reported previously for nickel boron electroless coatings.

The present invention of using lead tungstate was compared to prior art nickel-plating baths using thallium as stabilizer. In Bellis, U.S. Pat. No. 3,674,447, example 3 produced a coating of nickel 93%; boron 3.5%; thallium 3.5% with a knoop hardness of 900–1000. In Klein, U.S. Pat. No. 3,295,999, example 2 produced a coating of nickel 93%; boron 4%; thallium 3% with a knoop hardness of 1000–1100. In McComas, U.S. Pat. No. 5,109,613 example 1, produced a coating of nickel 90%; cobalt 4% boron 4%; thallium 2% with a knoop hardness of 1200–1300. The knoop hardness of the Bellis and McComas coatings before heat treatment was measured to be less than about 925.

These comparisons show the unexpected results of using lead tungstate as the stabilizer by achieving knoop hardness from 1400 to 2200 after heat treatment and 950–1050 before heat treatment.

The concentration of lead tungstate in the bath was varied producing the following results. In grams per gallon of lead tungstate in the bath: at 0.0025 the bath was unstable; at 0.003 a slight improvement; at 0.008 deposition rate was uncontrollable/mild drop out after 10 minutes; at 0.05 excellent results; at 0.56 good results; at 0.06 good results; at 0.065 good results/ slow deposition rates; at 0.07 same; at 0.09 slow rate; at 0.1 slow deposition rates 0.0004 mils per hour; at 0.2 slow deposition rates 0.0003 mil/hour; at 0.3 same; at 0.4 plating stops.

These results show that the concentration of lead tungstate in the bath can range between 0.003 to 0.30 grams per gallon. plating bath. The preferred of concentration range is greater than 0.008 to about 0.2.

With respect to the above description then, it is to be realized that the optimum proportions, process steps, and ingredients of the invention, to include variations in size, materials, shape, form, function and manner of operation, assembly and use, are deemed readily apparent and obvious to one skilled in the art, and all equivalent relationships to those described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

Now that the invention has been described,

What is claimed is:

1. An article having a wear-resistant amorphous coating comprising a nickel boride dispersed in a nickel/boron alloy wherein the nickel is 93 to 97 wt %, and the boron is 7 to 3 wt % and the coating has a Knoop hardness, using a 100 g load, of about 1400 to about 2200.

2. An article as in claim 1, wherein said wear resistant coating has a thickness from about 0.001 to 0.04 inch.

3. An article as in claim 1, wherein cobalt is substituted for nickel up to about 50% of the nickel.

4. An article as in claim 1 wherein the coating has a thickness in excess of 0.00025 inch.

5. An article as in claim 1 wherein the article is metal.

6. A method for depositing a metal coating containing nickel and boron on a substrate, said method comprising:
preparing a plating bath having a pH of at least 10 comprising
(a) about 0.175 to about 2.10 moles per gallon of coating bath of nickel ions;
(b) about 0.003 to about 0.3 grams per gallon lead tungstate as a stabilizer;
(c) a metal ion complexing agent in an amount effective to inhibit precipitation of said metal ions from the coating bath;
(d) an effective amount of a borohydride reducing agent; and
(e) optionally up to 1.05 moles per gallon of cobalt, immersing said substrate to be coated into said bath, electrolessly depositing the coating on the substrate, and heat treating said metal coating at 375° F. to 750° F. for one to 24 hours, whereby a metal coating is produced having a Knoop hardness, using a 100 g load, of at least 1400.

7. The method of claim 6 wherein the pH of said bath prior to coating is adjusted to between 12 and 14.

8. The method of claim 6 wherein the metal ion complexing agent comprises a compound selected from the group consisting of ethylenediamine, water soluble salts of tartaric acid and ammonia.

9. The method of claim 8 wherein the metal ions complexing agent is ethylenediamine.

10. The method of claim 6 wherein the borohydride reducing agent is selected from the group consisting of sodium borohydride, potassium borohydride, sodium trimethoxyborohydride, and potassium trimethoxyborohydride.

11. The method of claim 10 wherein the borohydride reducing agent is sodium borohydride.

12. A method for depositing a metal coating containing nickel and boron on a substrate, said method comprising:
preparing a plating bath having a pH of about 12 to about 14 and comprising:
(1) about 0.35 to about 1.57 moles per gallon of coating bath of nickel ions,
(2) about 0.008 to about 0.098 grams per gallon lead tungstate as a stabilizer, said lead tungstate being added to said bath in the form of a concentrate having a pH greater than 8, containing about 2 to about 31 grams per gallon of lead tungstate, about 100 to 700 ml of a metal ion complexing agent, and a pH modifier, alone or together with a reducer,
(3) about 3.3 to about 3.8 moles per gallon of metal ion complexing agent to inhibit precipitation of said metal ions from the coating bath,
(4) about 0.02 to about 0.033 mole per gallon of a borohydride reducing agent,
(5) optionally cobalt;
immersing said substrate to be coated into said bath, electrolessly depositing the coating on the substrate, and heat treating said metal coating at 375° F. to 750° F. for one to 24 hours, whereby a metal coating is produced having a Knoop hardness, using a 100 g load, of at least 1400.

* * * * *